(12) United States Patent
Neumann et al.

(10) Patent No.: US 7,063,736 B2
(45) Date of Patent: Jun. 20, 2006

(54) ANTISTATIC COATING, IN PARTICULAR FOR TONER TRANSFER DRUMS

(75) Inventors: Gert Neumann, Berlin (DE); Sabine Dreihofer, Warstein (DE)

(73) Assignee: AEG Elektrofotografie GmbH, Warstein (DE)

( * ) Notice: Subject to any disclaimer, the term of this patent is extended or adjusted under 35 U.S.C. 154(b) by 367 days.

(21) Appl. No.: 10/626,836

(22) Filed: Jul. 25, 2003

(65) Prior Publication Data

US 2004/0202949 A1    Oct. 14, 2004

(30) Foreign Application Priority Data

Jul. 30, 2002    (DE) ................................ 102 34 571

(51) Int. Cl.
*C09D 183/06*    (2006.01)

(52) U.S. Cl. ..................... 106/287.11; 528/30; 528/38; 524/755

(58) Field of Classification Search .......... 106/287.11; 528/30, 38; 524/755
See application file for complete search history.

(56) References Cited

U.S. PATENT DOCUMENTS

| 3,734,763 A | 5/1973 | Plueddemann |
| 3,819,675 A | 6/1974 | Plueddemann |
| 6,500,552 B1 * | 12/2002 | Dreihofer et al. ........... 428/446 |

FOREIGN PATENT DOCUMENTS

| DE | 2050467 | | 5/1971 |
| DE | 199 42 423 | * | 4/2001 |
| EP | 0 322 099 | | 6/1989 |
| EP | 0 511 650 A1 | | 4/1992 |
| EP | 0 709 407 A1 | | 1/1996 |
| EP | 0 869 155 A1 | | 7/1998 |
| JP | 52139680 | | 11/1977 |
| WO | WO 97/42550 | | 11/1997 |

* cited by examiner

*Primary Examiner*—Margaret G. Moore
(74) *Attorney, Agent, or Firm*—Hoffman, Wasson&Gitler

(57) ABSTRACT

The present invention relates to an electrically conductive coating which is producible by hydrolytic condensation of a mixture including at least one hydrolysable silicon compound of general formula $SiX_nR_{(4-n)}$ (I), wherein at least one of the R radicals is a mercapto-substituted alkyl or aryl group and is a compound of general formula $Z_aSiY_bR_{(4-a-b)}$ (II), wherein the Z radical is for example a quaternary ammonium salt, whereby the mixture to be hydrolytically condensed comprises at least one portion of an ether containing and alkyl group. The coating is particularly suitable for toner transfer drums and has high scratch resistance and good adhesion to the substrate.

13 Claims, No Drawings

ANTISTATIC COATING, IN PARTICULAR FOR TONER TRANSFER DRUMS

BACKGROUND OF THE INVENTION

The present invention relates to an electrically conductive coating, in particular for toner transfer drums, which is producible by hydrolytic condensation of a mixture comprising at least one hydrolysable silicon compound of general formula:

$$SiX_nR_{(4-n)} \quad (I),$$

wherein the radicals X, which can be the same or different, and can in particular be selected from the group comprising optionally alkoxy groups substituted by halogen or alkoxy, hydroxy groups. halogen, aryloxy and acyloxy groups, hydrogen, straight-chained, branched or cyclic alkyl, alkenyl, and alkinyl radicals. In particular with 5 to 20 carbon atoms, wherein the radicals R, which may be the same or different, are selected from the group comprising alkyl, alkenyl, alkinyl, aryl, whereby the groups can optionally have one or more substitutes inert under reaction conditions, and the abovementioned alkyl radicals include cyclic and aryl-substituted radicals, the alkenyl and alkinyl groups can likewise be cyclic and the aryl groups also include alkaryl groups, whereby the abovementioned groups optionally have one or more substitutes inert under reaction conditions and whereby n is a whole number from 1 to 4, whereby the mixture also includes one or more hydrolytically condensable compounds of silicon or other elements selected from the group comprising B, AL, P, Sn, Pb, transition metals, lanthanides and actinides, whereby at least one of the monomer compounds to be used for condensation is derived from a silicon compound of general formula:

$$Z_aSiY_bR_{(4-a-b)} \quad (II)$$

wherein the radicals and indices are the same or different and have the following meaning:
Y=hydrogen, halogen, hydroxy, optionally substituted alkoxy, acyloxy, alkyl carbonyl, alkoxy carbonyl, or $NR'_2$;
Z=quaternary ammonium salts derived from $R^2{}_2N$—$(R^3$—$NR^2$—$)_k$—$R^3$, or
Z=1/m $A^m\ominus R^2{}_2$—N⊕—$R^3$—, 1/m $A^m\ominus (HO$—$R^3)_2N\oplus$—$R^3$—, 1/m $A^m\ominus (R^2O)_2P\oplus(O)$—$R^3$—, 1/m $A^m\ominus R^2{}_2$—N)$_2$ C—S⊕—$R^3$, 3/n $K^n\oplus(OOC\ominus)_2$—N—$R^3$—N(COO$\ominus$)—$R^3$—, 1/m $A^m\ominus H_2C{=}C$—$(R^2)$—$R^3$ N ⊕ $(R^2{}_2)$—$R^3$—, 1/m $A^{m\ominus H}{}_2C{=}C$—$(R^2)$—CO—O—$R^3N\oplus(R^2{}_2)$—$R^3$—,
R=optionally substituted alkyl, alkenyl, aryl, alkylaryl, or arylalkyl;
R'=hydrogen, alkyl, or aryl;
$R^2$=hydrogen, optionally substituted alkyl, alkenyl, aryl, alkylaryl, or arylalkyl;
$R^3$=optionally substituted alkylene, alkenylene, or arylene;
$A^m\ominus$=anion with a valence of m;
$K^n\oplus$=cation with a valence of n;
a=1, 2, or 3;
b=1, 2, or 3;
a+b=2, 3, or 4; and
k=0, 1, 2, or 3. An antistatic coating of the previous type, in particular for toner transfer drums, is disclosed in DE 199 42 423 A1.

Toner transfer drums for laser printers, copiers, and fax machines are especially favourably produced in various dimensions and unit quantities by using organic photoconductors, whereby, by the incorporation of photosensitive pigments in specially purified polymers in the form of a so-called generator layer on an aluminium support and a transport layer thereon composed of a polymer doped with said photoconductor, the electrophotographic function is achieved. Although the above transport layer is mostly comprised of polycarbonate and stable, a relatively soft layer with minimal scratch resistance results from depositing the photoconductors designated as OPC's.

It is evident that the large number of different technical solutions, the result of which ought to be improved abrasion resistance of such systems, cannot at present yet be manufactured in a marketable product. Of the existing proposals, as to how hardness and friction resistance of such systems for technical application can be improved, the application of silane hydrolysate enamels has proven particularly successful on account of their extremely dense network structure or those hybrid polymers formed partially from inorganic constituents. At the same time it is evident that a combination of high friction resistance with the required conductibility was previously always associated with skimming with another property.

For example, Patent DE 30 32 773 describes an image carrier having a hard, cross-linked surface layer, which however exhibits too high a surface resistance. An image carrier having a surface layer based on metal alkoxide and alkyl/aryltrialkoxysilane, described in Patent DE 40 10 328, has the same properties, whereby it becomes clear that, based on their extraordinarily dense network structure, silane hydrolysate lacquers or those hybrid polymers formed partially from inorganic constituents are particularly significant for the coating of image carriers or toner transfer drums. EP 0 450 625 A1 describes silane hydrolysate enamels which are quick-setting under UV radiation and based on vinyl mercapto addition for producing scratch-resistant coatings. These coating systems harden in the absence of a photo initiator within a brief curing period.

As based on DE 199 42 423 A1, this can also be used for toner transfer drums, when specific electrolytically effective compounds such as quaternary ammonium salts are incorporated for diverting charges at illuminated points. Unfortunately, such friction-resistant coatings have a high polar proportion of surface energy, such that low-ohm toner constituents are deposited, and after relatively few printings an unwanted image run ensues. In search of the causes for this behaviour it was assumed that if possible non-condensed silanol groups determine the polar portion of the layer. Using $Si^{29}$ spectrography the content of varying degrees of condensation can be determined as compared to ascertaining the silanol with the proton resonance spectroscopy with adequate accuracy. Checking the silanol content can establish that only a minimal silanol portion can be further condensed by relatively long subsequent thermal curing at 80° C. This corresponds to still occurring insufficient imaging of dots at 600 dpi single printing.

A feature of the present invention is to provide an antistatic coating of the type initially described, in particular an electrically conductive lacquer, after curing at low temperatures, for the coating of toner transfer drums, whereby the resulting coating has high scratch resistance and good adhesion to the substrate. A further requirement is that said coating should be satisfactorily curable in the shortest possible time at relatively low temperatures. In addition, the conductive coating material should have sufficient storage stability in order to enable conversion in practice. To enable unrestricted use of the corresponding finished products (copiers, printers, et al.) considerable insensitivity to tropical climates (high humidity) should be present.

For this, the existing technical deficits with respect to deposits, which originate from the toner, should be hindered by a specific setting of the polar portion of the surface energy. In a 'normal' layer these are constantly being rubbed off with the paper, and are concentrated at high friction resistance and on account of the high adhesion forces, based on the polar portion, on such a scratch-resistant layer. Accordingly, it is a further feature of the invention to minimise the polar portion, without excessively severely restricting the electrical properties.

SUMMARY OF THE INVENTION

The solution to this task is supplied by an antistatic coating of the type initially described having the characterising features of the main claim.

The solution according to the present invention is based inter alia on the idea of reducing the number of resulting silanol groups, in using vinyl mercapto addition for constructing a friction-resistant top coat by UV curing of a suitable enamel and an electrolytically effective compound e.g. of a quaternary ammonium salt for diverting charges to the illuminated dots, and additionally by appropriate measures. Surprisingly, this is achieved by the addition of ethers, which have an alkenyl group, to the mixture to be hydrolytically condensed.

According to a further development of the invention in the mixture to be hydrolytically condensed a portion of an ether having a vinyl group is preferably used. This is particularly preferably a vinyl alkylether, for example a vinyl butyl ether. In the mixture to be hydrolytically condensed, on which this is based, preferably at least a hydrolysable silicon compound is used, wherein this is a (mercaptoalkyl)alkoxysilane. Furthermore, preferably at least one hydrolysable silicon compound in the mixture is a vinylalkoxysilane. It is also preferred that the mixture contains a (mercaptoalkyl) trialkoxysilane compound and at least a vinylalkoxysilane compound as hydrolysable silicon compound, whereby, with respect to the quantity of the abovementioned (mercaptoalkyl) alkoxysilane compound, this vinylalkoxysilane compound is used preferably in minimal quantity and a quantity of at least one ether containing a vinyl group is additionally added to the quantity. Said vinylether or alkenylether thus replaces a portion of the vinylalkoxysilane compound in the mixture to be hydrolysed. The resulting coating according to the present invention has both considerable hardness and good functionality.

Likewise it was surprisingly found that the silanol portion is reduced by the linear siloxane units being used with terminal silanol groups.

DETAILED DESCRIPTION OF THE INVENTION

The inventive enamel for coating a substrate are manufactured preferably by hydrolytic condensation of several hydrolysable silicon compounds in a suitable solvent, whereby 1 to 50 mol percent of all groups bound to silicon are non-hydrolysable groups. By way of advantage a portion of the non-hydrolysable groups can avail itself of a mercapto radical. According to the invention 10 to 40 mol percent of the non-hydrolysable groups can be polymerisable groups, which are accessible to the vinyl mercapto addition. Non-hydrolysable X groups with mercapto radical are preferably selected from mercaptoalkyl radicals with 1 to 6 carbon atoms, such as e.g. 3-mercaptopropyl, 4-mercaptobutyl and 6-mercaptohexyl.

With respect to the content of mercapto groups 1 to 90 mol percent of the polymerisable groups can be bound to vinylether, in accordance with the present invention.

The ratio of ethylenically unsaturated bonds to mercapto radicals in or on non-hydrolysable groups can be 25:1 to 1:1., so that the enamel is optionally cured by radiation in the absence of a photoinitiator; and/or thermal curing of the overlayer is carried out. Hydrolysable silicon compounds particularly suitable for the enamel according to the invention are those of general formula:

$$SiX_nR_{(4-n)} \quad (I)$$

wherein the X radicals, which can be identical or different, in particular comprise alkoxy groups such as e.g. methoxy, ethoxy, n-propoxy, 1-propoxy and butoxy and/or hydroxy groups, but halogen (F, Cl, Br and J, in particular Cl and Br), aryloxy (e.g. phenoxy) and/or acyloxy groups, such as e.g. acetoxy and propionyloxy, can form X, when the resulting hydrolysis products are removed or solidly bound.

Apart from the abovementioned preferred X radicals hydrogen and alkoxy radicals having 5 to 20 carbon atoms and halogen- and alkoxy-substituted alkoxy groups (such as e.g. 2-methoxyethoxy) can be mentioned as other likewise suitable groups. Other suitable X groups are straight-chained, branched or cyclic alkyl, alkenyl and alkinyl radicals with 5 to 20 carbon atoms, such as e.g. n-pentyl, n-hexyl, dodecyl and octadecyl. Since the X radicals are split off by hydrolysis. and the hydrolysis product has to be removed appropriately, those X radicals are particularly preferred which carry no substitutes and result in hydrolysis products with low molecular weight, such as e.g. low alcohols, such as methanol, ethanol, propanol, n-, t-, sec- and tert-butanol.

The R radicals, which can be identical or different, are preferably selected from alkyl, such as e.g. methyl, ethyl, propyl and butyl, alkenyl such as e.g. vinyl, 1-propenyl, 2-propenyl and butenyl, alkinyl, such as acetylenyl and propargyl and aryl, such as e.g. phenyl and naphthyl, whereby the abovementioned groups (with the exception of halogen and hydroxy) optionally can have one or more substitutes inert under reaction conditions, such as e.g. halogen and alkoxy, and n is a whole number from 1 to 4.

The abovementioned alkyl radicals also include the corresponding cyclic and aryl-substituted radicals, such as e.g. cyclohexyl and benzyl, whereas the alkenyl and alkinyl groups can likewise be cyclic and the abovementioned aryl groups can also include alkaryl groups (such as tolyl and xylyl). The compounds of formula (I) can be used in part or in whole in the form of precondensation, that is, compounds which originated through partial hydrolysis of the compounds of formula (I) either alone or in a mixture with other hydrolysable compounds, as will be described hereinbelow in greater detail.

Precondensates based on dialkyl or diaryldialkoxysilanes, which contain no mercapto groups or double bonds, are particularly suitable in terms of this invention. These silanes help to reduce the portion of non-condensed silanol groups. Such oligomers preferably soluble in the reaction medium can be straight-chained or cyclic, low-molecular part condensates (polyorganosiloxanes) with a degree of condensation from 2 to 100, in particular approximately 2 to 6.

In this way the silanol groups resulting from hydrolysis of the monomer compounds according to formula (I) are bound in precondensates, such that their concentration is clearly decreased. In practical terms this becomes noticeable through a minimal surface polarity.

The necessary electrical conductivity (between the surface and the generator layer) is caused by an addition, which is obtained by hydrolytic (partial) condensation of one or more hydrolytically condensable compounds of silicon and optionally other elements from the group B, Al, P, Sn, Pb, transition metals, lanthanides and actinides, and/or precondensates derived from the abovementioned compounds, by the effect of water or humidity and optionally in the presence of a catalyst and/or a solvent. Preferably, the combination is to be achieved with one of the UV-curing components. One or more of the monomer compounds of general formula (11) is to be derived from silicon compounds:

$$Z_a SiY_b R_{(4-a-b)} \tag{II}$$

wherein the radicals and indices are identical or different. Here Y-hydrolysable groups, such as hydrogen, halogen, hydroxy, optionally substituted alkoxy, acyloxy, alkylcarbonyl, alkoxycarbonyl or $NR_2$ and 2 are preferably quaternary ammonium salts bound by aliphatic radicals to the silicon.

These additives based on monomer compounds of formula II are incorporated via covalent bonds into the inorganic network predetermined by the components I and II. The sum of the portions of the compounds according to formula II in the dried or hardened coating formed out of the usual components should be between 5 and 40 mol %. Binding the electrolytically efficacious substances in a silicic acid (hetero) polycondensate achieves not only the necessary reduction of the flow resistance, but also optimising of the friction resistance. The coating according to the present invention can be manufactured in a manner customary in this field. If silicon compounds are used virtually exclusively (relatively reactively inactive during hydrolysis), then hydrolytic condensation can take place in most cases by the stoichiometrically necessary quantity of water or optionally an excess of water being added directly at ambient temperature or with light cooling (preferably with stirring and optionally in the presence of a hydrolysis or condensation catalyst) to the hydrolysable silicon compounds, which are present either as such or dissolved in a suitable solvent, and the resulting mixture is then stirred for a period (from one to several hours). Independently of the reactivity of the present compounds hydrolysis usually takes place at temperatures between 20 and 130° C., preferably between 0° C. and 30° C. or the boiling point of the optionally used solvent. As already indicated, the best way of adding water depends above all on the reactivity of the starting compounds being used. In this way e.g. the dissolved starting compounds can be dropped slowly to an excess of water or water is added in a portion or portionwise to the optionally dissolved starting compounds.

As solvents, apart from the low aliphatic alcohols (e.g. ethanol and isopropanol) ketones, preferably low dialkylketones, such as acetone and methylisobutylketone, ether, preferably low dialkylether such as diethylether and dibutylether, THF, amides, esters, in particular ethyl acetate, dimethylformamde and their mixtures are also considered. If only hydrolysable silicon compounds are used, then the use of low dialkylethers as solvents can prove particularly advantageous. In particular using these ethers counteracts too rapid gelling of the enamel, whenever the latter has relatively many mercapto radicals. Surprisingly, the inventive vinylethers also have a stabilising effect.

According to the invention the compounds described as per formula II act preferably as hydrolysis and condensation catalysts. In addition, compounds splitting off protons can be used. Examples thereof are organic and inorganic acids, such as acid salts, acetic acid, formic acid and/or citric acid. The concentration of additional catalysts can be e.g. as much as 3 mol per litre, whereby good solubility in water should allow the catalyst to be washed with water after an average condensation stage is reached.

According to type and quantities the condensation time aligns with each starting component, the optionally used catalyst, the reaction temperature, etc. Polycondensation is generally carried out at normal pressure, but it can also be performed at increased or reduced pressure.

The inventive enamel (the coating) can be used to coat image carriers or toner transfer drums. A coating made of other synthetic materials is also possible, which should have a defined charge on its surface. For the coating the enamel obtained by intermixing the individual components is used either as such or following partial or almost complete removal of the solvent used, or the solvent formed during reaction in the coating process according to the present invention. In a few cases it can prove advantageous to replace the excess water and the solvent formed in the components obtained after polycondensation and the optionally used solvent by another solvent in order to stabilise the enamel.

Irradiation with UV light has proven effective for curing the enamel after it is applied to the image carrier or the toner transfer drum. It was ascertained that for the UV curing of the enamel manufactured according to the present invention the presence of a photoinitiator is not required. According to the present invention the enamel produced as described hereinabove can be applied to toner transfer drums made of all conceivable synthetic materials. To ensure excellent adhesion of the overcoat on the synthetic substrate as a rule it is recommended to keep the time between drying the OPC layer and applying the abovementioned enamel as short as possible. Otherwise the synthetic substrate can be subjected, prior to coating to surface treatment, e.g. by lixiviation, priming with a primer, corona treatment etc. Before curing the solvent is removed from the applied enamel preferably via evaporation. After this curing can be carried out by irradiation (e.g. with a UV emitter, a laser etc.) in a manner known in and of itself. With coating it can be an advantage to carry out subsequent thermal hardening after radiation curing, in particular for the purpose of removing an optional excess of unsaturated groups or still present solvent. With the process according to the present invention as a rule layer thicknesses of 3 to 50 μm are achieved for image carriers or toner transfer drums, and in particular 2 to 6 μm. Understandably the process according to the present invention is not limited to applying only a single layer of enamel to the substrate, but there is also the possibility of to apply additional layers after application and optional curing of one layer and thus to create multi-layer structures. Even regenerating worn-out layers is possible.

The coating process according to the present invention or the enamel according to the present invention results in particular in the following surprising advantages: Highly scratch-resistant overcoats, which adhere well to the synthetic substrate, can be obtained which show no increase in residual potential after coating. Particularly in the case of thermally low-chargeable substrates good curing can be achieved in a short period via UV treatment under mild conditions. UV curing can be carried out depending on the output of the radiator in less than 60 seconds. The following examples explain the present invention, without limiting it in any way.

EXAMPLE 1

Comparative Example

A mixture of 102 g ethyl acetate, 51 g butylacetate and 51 g butoxyethanol are introduced as solvent. A quantity of 0.2 mol (38.06 g) vinyltriethoxysilane (VTEO), 0.2 mol (39.3 g) mercaptopropyltrimethexysilane (MPTMO) and 0.015 mol (12.4 g of the 60% solution in methanol) octadecyidimethyl (3-trimethoxysilylpropyl) ammonium chloride (ODDMA) are weighed into this mixture and water is added at 15 to 20° C. with 1.2 mol (21.6 g). During the course of the reaction, the mixture remained initially turbid after dropwise addition of said quantity of water. To this charge was then added 0.7 g citric acid monohydrate, at which point said charge turned clear. The reaction was completed by stirring the reaction mixture for 6 hours at room temperature. The coating solution thus obtained was applied as a third layer onto a toner transfer drum. This can be accomplished by spray coating. This can be accomplished by spray coating.

This element, which acts as a photoconductor, comprised a cylindrical aluminium substrate having a diameter of 30 mm and a length of 360 mm, and a coating consisting of an approximately 1 μm-thick generator layer and an approximately 24 μm-thick transport layer. Said generator layer contains a phthalocyanine pigment dispersed in a polyvinylbutyral binder. Said transport layer comprises a compound consisting of equal portions of a hole transport material (N,N'-bis(3-methylphenyl)-N,N'-diphenyl-(1,1'-biphenyl-4,4'-diamine) and a bisphenol Z polycarbonate binder. The lacquer, which was applied and dried on at room temperature, was cured in a rotating UV oven (by Silberberger, for example) within approximately 120 seconds, whereby the rotary table speed was 12 to 13 rpm. The total radiant power hereby applied to the layer should not exceed approximately 4 J/cm$^2$.

The photoconductor drum provided with this protective layer is used in a conventional printer that was charged by means of a charging roller, laser diode exposure to create the latent charge image, development with a magnetic brush to create the toner image, electrostatic transfer of said toner image to the paper, and cleaning of said photoconductor drum with a scraper. Whereas said photoconductor drum did not have a protective layer (after a print test of 20,000 prints, a decrease of approximately 5 μm in the layer density was observed), for the drum, which was provided with a protective layer, no measurable decrease in the layer density was detected. The highly friction-resistant layer exhibits a polar portion of 13 mN/m with an overall surface energy of 30 mN/m. With respect to print quality in the long-term print test this leads to an increasing loss in contrast.

EXAMPLE 2

Solution According to the Present Invention

A mixture of 75 g toluene, 75 g butyl acetate, and 75 g butoxyethanol is prepared as the solvent. Into this mixture were weighed out 0.2 mol ((20.03 g) vinylbutylether and a quantity of 0.17 mol (25.2 g) vinyl trimethoxysilane (VTMO), 0.34 mol (66.76 g) mercaptopropyltrimethoxysilane, and 0.03 mol (24.8 g of a 60% solution in methanol) octadecyldimethyl (3-trimethoxysilylpropyl) ammonium chloride (ODDMA) and reacted at 15° to 20° C. with 1.9 mol water in the form of 0.1 N hydrochloric acid (35 g). During the course of the further reaction, the mixture, which initially remained turbid after dropwise addition of said quantity of water, turned clear.

The reaction was completed by stirring the reaction mixture for 6 hours at room temperature, with the addition of 21 g of a precondensate obtained from diphenyidimethoxysilane and dimethyldimethoxysilane. After addition of 0.4% camphorquinone, the coating solution thus obtained is applied as a third layer onto a toner transfer drum. This can be accomplished most favourably by flow coating, whereby said coating solution is poured onto the substrate by means of a large-gauge nozzle. This substrate comprises a cylindrical aluminium substrate having a diameter of 30 mm and a length of 360 mm, and a coating consisting of an approximately 10 □m-thick generator layer and an approximately 24 μm-thick transport layer. Said generator layer comprises a phthalocyanine pigment dispersed in a polyvinylbutyral binder. Said transport layer comprises a compound consisting of equal portions of a hole transport material and a bisphenol Z polycarbonate binder.

Said hole transport material comprised 70% 4-dibenzylamino-2-methylbenzaldehyde-N,N-diphenylhydrazones and 30% 1,1-bis(p-diethylaminophenyl)-4,4-diphenyl-1,3-butadienes.

For curing, the dried-on layer was cured when rotating within approximately 180 seconds in front of a lamp irradiating short-wave light (300 to 400 nm wavelength), whereby the surface power was markedly lower than in Example 1. The photoconductor drum provided with the protective layer is used in a conventional printer which is charged by means of a charging roller, laser diode exposure to create the latent charge image, development with a magnetic brush to create the toner image, electrostatic transfer of the toner image to the paper, and cleaning of said photoconductor drum with a scraper. Whereas said photoconductor drum does not have a protective layer (after a print test of 20,000 prints, a decrease of approximately 5 □m in the layer density was observed), for the drum, which was provided with a protective layer, no measurable decrease in the layer density was detected.

The highly friction-resistant layer exhibits a polar portion on 4 mN/m at a substantially lesser overall surface energy of 19 mN/m. This seems to be the cause of why the print quality is superior in the long-term print test. Homogeneity of the graytone, faultless black and white printing, high-resolution capability, and a constant residual potential are not influenced by the protective layer, and were maintained in said long-term print test. In particular, in a print test at elevated air moisture (22° C., 80% relative humidity), no change in the print quality is observed.

The invention claimed is:

1. An electrically conductive coating, in particular for toner transfer drums, that is producible by hydrolytic condensation of a mixture comprising at least one hydrolysable silicon compound of general formula:

$$SiX_nR_{(4-n)} \qquad (I),$$

wherein the radicals X, which are the same or different, and are be selected from alkoxy groups substituted by halogen or alkoxy, hydroxy groups, halogen, aryloxy and acyloxy groups, hydrogen, straight-chained, branched or cyclic alkyl, alkenyl, and alkynyl radicals; and wherein the radicals R, which may be the same or different, are selected from alkyl, alkenyl, alkynyl, aryl, and the above mentioned alkyl radicals include cyclic and aryl-substituted radicals, the alkenyl and alkynyl groups can be cyclic and the aryl groups include alkaryl groups, whereby the abovementioned groups have one or more substitutes inert under reaction conditions and whereby n is a whole number from 1 to 4, whereby the mixture further includes one or more hydrolytically condensable compounds of silicon or other elements selected from B, Al, P, Sn, Pb, transition metals, lanthanides or actinides, whereby at least one monomer compound to be used for condensation is derived from a silicon compound of general formula:

$$Z_a SiY_b R_{(4-a-b)} \quad \text{(II)}$$

wherein the radicals and indices are the same or different wherein:

Y=hydrogen, halogen, hydroxy, optionally substituted alkoxy, acyloxy, alkyl carbonyl, alkoxy carbonyl, or $NR'_2$;

Z=quaternary ammonium salts derived from $R^2_2N-(R^3-NR^2-)_{k-R^3}-$, or

Z=$1/m\ A^{m\ominus}R^2_2-N^{\oplus}\text{---}R^3-$, $1/m\ A^{m\ominus}(HO-R^3)_2 N^{\oplus}-R^3-$, $1/m\ A^{m\ominus}(R^2O)_2P^{\oplus}(O)-R^3-$, $1/m\ A^{m\ominus}(R^2_2-N)_2C-S^{\oplus}-R^3$, $3/n\ K^{n\oplus}(OOC^{\ominus})_2-N-R^3-N(COO^{\ominus})-R^3-$, $1/m\ A^{m\ominus}H_2C=C-(R^2)-R^3N^{\oplus}(R^2_2)\ R^3-$, $1/m\ A^{m\ominus}H_2C=C-(R^2)-CO-O-R^3N^{\oplus}(R^2_2)-R^3-$, R=optionally substituted alkyl, alkenyl, aryl, alkylaryl, or arylalkyl;

R'=hydrogen, alkyl, or aryl;

$R^2$=hydrogen, optionally substituted alkyl, alkenyl, aryl, alkylaryl, or arylalkyl;

$R^3$=optionally substituted alkylene, alkenylene, or arylene;

$A^{m\ominus}$=anion with a valence of m;

$K^{n\oplus}$=cation with a valence of n;

a=1, 2, or 3;

b=1, 2, or 3;

a+b=2, 3, or 4; and k=0, 1, 2, or 3, characterised in that the mixture to be condensed hydrolytically comprises at least a portion of an ether having an alkenyl group.

2. The electrically conductive coating as claimed in claim 1, wherein the mixture comprises at least one hydrolysable silicon compound of formula $$SiX_n R_{(4-n)} \quad \text{(I)},$$

wherein one of the R radical is a mercapto-substituted alkyl or aryl group.

3. The electrically conductive coating as claimed in claim 1, wherein the mixture to be condensed hydrolytically comprises a portion of an ether exhibiting a vinyl group.

4. The electrically conductive coating as claimed in claim 3, wherein the mixture to be condensed hydrolytically comprises a portion of a vinylalkyl ether.

5. The electrically conductive coating as claimed in claim 4, wherein the mixture to be condensed hydrolytically comprises a portion of a vinylbutyl ether.

6. The electrically conductive coating as claimed in claim 1, wherein at least one hydrolysable silicon compound in the mixture is a (mercaptoalkyl)alkoxysilane.

7. The electrically conductive coating as claimed in claim 1, wherein at least one hydrolysable silicon compound in the mixture is a vinylalkoxysilane.

8. The electrically conductive coating as claimed in claim 7, wherein the mixture contains at least one (mercaptoalkyl)trialkoxysilane compound and at least one vinylalkoxysilane compound, whereby the vinylalkoxysilane compound, relative to the quantity of the (mercaptoalkyl) alkoxysilane compound, is employed in a lesser quantity and the mixture additionally contains a quantity of an ether exhibiting at least one vinyl group.

9. The electrically conductive coating as claimed in claim 1, wherein the coating is produced by the addition of at least one optionally substituted dialkoxysilane following hydrolysis of the compounds of the starting mixture.

10. The electrically conductive coating as claimed in claim 9, wherein the coating is produced by the addition of at least one dialkoxysilane or at least one dialkyldialkoxysilane or at least one diaryldialkoxysilane following hydrolysis of the compounds of the starting mixture.

11. The electrically conductive coating as claimed in claim 10, following hydrolysis of the compounds of the starting mixture, at least one dialkoxysilane is added in the form of a precondensate.

12. The electrically conductive coating as claimed in claim 1, wherein the coating is produced by hydrolysis of a mixture comprising at least one compound of formula:

$$Z_a SiY_b R_{(4-a-b)} \quad \text{(II)}$$

wherein at least one of the Z radicals is a quaternary ammonium group, in which at least one of the substitutes on the nitrogen is an alkyl group.

13. The electrically conductive coating as claimed in claim 1, wherein the coating is produced by hydrolysis of a mixture comprising at least one compound of formula:

$$Z_a SiY_b R_{(4-a-b)} \quad \text{(II)}$$

wherein at least one of the Z radicals is a quaternary ammonium group, in which at least one of the substitutes on the nitrogen is an aliphatic group.

* * * * *